(12) United States Patent
Beck

(10) Patent No.: US 6,760,654 B2
(45) Date of Patent: Jul. 6, 2004

(54) SYSTEM FOR DETERMINING THE POSITION OF AN AGRICULTURAL VEHICLE

(75) Inventor: Folker Beck, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/151,514

(22) Filed: May 20, 2002

(65) Prior Publication Data

US 2002/0193928 A1 Dec. 19, 2002

(30) Foreign Application Priority Data

Jun. 16, 2001 (DE) .......................................... 101 29 135

(51) Int. Cl.⁷ .............................................. G01C 21/00
(52) U.S. Cl. ..................... 701/50; 342/357.08; 701/213
(58) Field of Search .......................... 701/50, 202, 207, 701/208, 213, 209, 214; 342/357.08

(56) References Cited

U.S. PATENT DOCUMENTS

| | | | |
|---|---|---|---|
| 4,228,636 A | 10/1980 | Homburg ................. 56/10.2 R |
| 5,752,374 A | 5/1998 | Allworden et al. ............ 56/341 |
| 5,951,612 A * | 9/1999 | Sahm .......................... 701/50 |
| 5,951,613 A * | 9/1999 | Sahm et al. ................... 701/50 |
| 5,999,126 A | 12/1999 | Ito ........................... 342/357.1 |
| 6,095,254 A | 8/2000 | Homburg ........................ 172/6 |
| 6,101,795 A * | 8/2000 | Diekhans ................. 56/10.2 F |
| 6,128,574 A | 10/2000 | Diekhans .................... 701/209 |
| 6,236,916 B1 | 5/2001 | Staub et al. .................. 701/29 |

FOREIGN PATENT DOCUMENTS

EP 0 604 404 A2 6/1994
WO 94/24845 11/1994

OTHER PUBLICATIONS

Peter Schulze Lammers: "Genaue Positionsbestimmung GPS mit differentieller Korrektur uber Radio Data System (RDS)", 1 page.

* cited by examiner

*Primary Examiner*—Marthe Y. Marc-Coleman

(57) ABSTRACT

A system for locating an agricultural vehicle in a field using two position sensors. A first position sensor is a GPS sensor using satellite signals to locate the vehicle. The second position sensor is a crop edge sensor for locating the vehicle relative to a crop being harvested. A controller receives the first and second position signals and calculates the position of the vehicle based on these two position signals. Both position signals contain signal quality information that is evaluated by the controller and weights the position calculation accordingly. The system can be used in conjunction with a steering controller to automatically guide the vehicle through a field.

21 Claims, 3 Drawing Sheets

SYSTEM FOR DETERMINING THE POSITION OF AN AGRICULTURAL VEHICLE

FIELD OF THE INVENTION

The present invention is directed to a system for locating an agricultural vehicle wherein signal quality information from two position sensors is evaluated and used to calculate the position of the vehicle by weighting the position signals.

BACKGROUND OF THE INVENTION

WO 94/24845 A and U.S. Pat. No. 6,128,574 disclose an automatically steering system for agricultural vehicles wherein the system locates the vehicle on the basis of their immediate position and an intended target path. The position is determined from a location system by means of a satellite system (GPS or DGPS). So that in the case of a failure of the satellite signal the location system can continue to be operated further, U.S. Pat. No. 6,128,574 provides that the utility vehicle be equipped with operating direction sensors and velocity sensors. Furthermore, both references propose that the signals of the satellite system be supplemented by sensors attached to the utility vehicle, that can detect, for example, the crop edge or windrow of the crop being harvested. For this purpose the crop edge orientation system can be provided, according to WO 94/24845 A, in the form of an image operating system or, according to U.S. Pat. No. 6,128,574, a reflex location system (such as, for example, a laser scanner) or a harvested edge orientation system relying on mechanical touching.

Currently, the local direction of operation sensor and the local velocity sensor are used only upon a failure of the satellite system, while the harvested edge sensors are used continuously in order to improve the accuracy of the position signal. But there are cases in which a satellite signal is available, but whose accuracy is not sufficient due to errors in the propagation time caused by near-by obstacles in order to guide the utility vehicle with sufficient precision. It is also conceivable that the accuracy of the local sensor used for the recognition of the boundaries of the stand of the crop is not adequate, in order to use its position signal to improve the accuracy of the position signal derived from the satellite signal. Cases of this type cannot be avoided by the known automatic steering systems.

SUMMARY OF THE INVENTION

It is an object of the present invention to provide an improved location system for determining the position of an agricultural vehicle, that is distinguished by high accuracy even under unfavorable conditions.

The first position signal and the second position signal are generated by separate sensors independent of one another. These sensors generate first and second position signals that are communicated to a controller. At least one of the position signals contain signal quality information that is also communicated to the controller. The quality information is directed to the accuracy of the respective position signal. The controller evaluates the signal quality information and develops a weighting factor used to calculate the position of the harvesting machine based on the first and second position signals. If the quality information points to a high degree of accuracy of the first position signal, the first is considered exclusively or at least to a large proportion in the calculation of the position. The second position signal is considered only in a small proportion or not at all. Analogously the first position signal is ignored or considered only to a small degree, if the quality information points to a low degree of accuracy of the first position signal. With an approximately median accuracy of the first position signal, the first and the second position signals can be considered with equal weight.

In this way the actual position is determined in an exact and reliable way by consideration of the particular measurement accuracy of at least one of the position signals. The invention can be used in connection with an automatic steering arrangement, but also, for example, in order to generate position signals for yield mapping.

In a preferred embodiment the controller is supplied with quality (accuracy) information about both position signals. The controller also uses this information in order to establish which position signal is considered to which degree.

The first position signal is usually a signal generated by satellite signals that can be generated, for example, by means of a corresponding antenna that interacts with the GPS (global positioning system) or another satellite system. But the employment of an inertial navigation system is also conceivable.

The second position signal can be generated by a local sensor on the agricultural vehicle. The local sensor can detect the movement of the utility vehicle (direction of operation and velocity). Alternatively, or in addition, the local sensor is a sensor that detects the position of the vehicle relative to a stationary object, particularly the operational boundary or a crop edge. Sensors of this type are sufficiently well known in the form of an image processing operating system, laser scanning sensors, or mechanical scanning arrangements for the detection of rows of crop as they are already used for automatic steering of agricultural machines. There is also the possibility of using a laser distance sensor in which the transmitter and/or the receiver is not rotated, but a mirror rotating continuously or step-by-step is used to scan the visible region. It can scan an angular region of up to 180°. Sensors of this type are available from Sick A.G. D-72796, Reute, under the designation LMS. Sensors for the measurement of the width of cut on cutter heads can also be used.

The invention is preferably applied to an arrangement for the automatic steering of an agricultural vehicle. The controller is provided with a memory in which is stored a target path for the vehicle. The target path defines the path the vehicle is to follow in a selected operation. The controller generates a steering signal on the basis of the position calculated from the position sensors and target path information stored in the memory. The controller generates a steering signal that is communicated to a steering controller.

Furthermore it is proposed to use the quality information for the selection of the target path information from several possible target path possibilities. Corresponding to the accuracy information about the position signal of one of the position sensors, that can be derived from the quality information, the appropriate target path information is selected, which can best be combined with the position signal of the position sensor. For example, it is conceivable to steer the vehicle, in the case of sufficient accuracy of a position signal that interacts with a stationary object, for example, a crop edge along the object (operating boundary). In this case the target path information corresponds to the intended position of the vehicle relative to the boundary of operation. A digital map generated in advance of the area to be operated upon is not required. If the quality information points to the fact that the accuracy of this position signal is not adequate or is no longer adequate, then the evaluation arrangement can derive the target path information automatically from the path previously covered (in the form of a learning operation) from corresponding position information recorded in the form of a map. The steering is then performed on the basis of a signal of the other position sensor. The target path information now corresponds to the map that defines the path to be covered. If it is found later on the basis of the quality information that the position signal defining the boundary operation is again sufficiently accurate, the latter can again be used for the steering of the utility vehicle. Analogously it is conceivable to steer the utility vehicle on the basis of satellite information with a map stored in memory and in the case of a failure of the satellite signal to use a sensor of the boundary (crop edge) and a velocity sensor to generate the steering signal. It becomes possible generally to use as target path information not necessarily a map stored in advance that is costly to generate, but information that is easily obtained, for example, the desired position of a boundary of operation or an information about a path previously covered.

DETAILED DESCRIPTION

Figure 1:
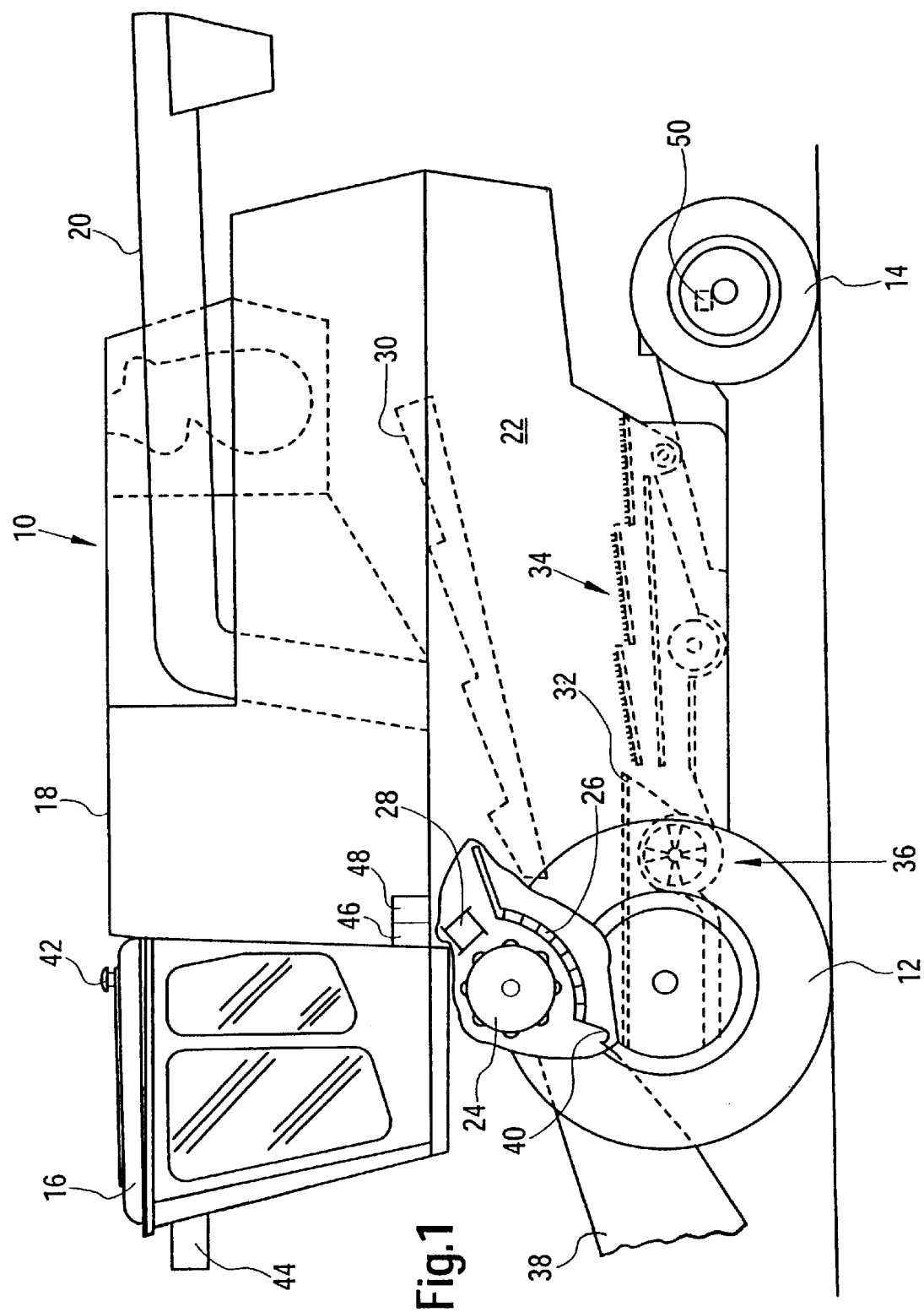
FIG. 1 is a semi-schematic side view of an agricultural vehicle having an automatic steering system.

The agricultural vehicle 10, illustrated in FIG. 1, is a combine. The combine is supported on front driven and rear steerable wheels 12 or 14 and is provided with an operator's cab 16 from which it is controlled by an operator. The present invention could also be used on other agricultural vehicles, such as, self propelled forage harvesters, self-propelled large balers and tractors having ground engaging implements or seeding machines. A grain tank 18 is located behind the operator's cab 16. The grain tank 18 is used for temporarily storing clean grain until it is transferred to a grain cart or truck by unloading auger 20. The grain tank 18 is supported on a frame 22 formed by two side sheets. The harvested crop is separated into its large and small components within the side sheets. The crop is first harvested by a harvesting assembly 64 (See FIG. 2) and from the harvesting assembly 64 the harvested crop is directed to a feeder house 38. The feeder house 38 is an upwardly sloping conveyor which conveys the harvested crop past a stone trap 40 to a threshing assembly. The threshing assembly comprises a threshing cylinder 24 with associated concave 26 and a beater 28. The threshed crop material is transferred to a separation assembly comprising straw walkers 30 which expand the threshed crop mat to release grain trapped in this mat. Clean grain and chaff falling from the concave 26 and the straw walkers 30 is directed to a grain pan 32. Crop material other than grain is expelled over the rear of the straw walkers 30 out the rear of the combine. The grain pan 32 directs the clean grain and chaff to a cleaning assembly which comprises sieves 34 and a cleaning fan 36. The cleaning fan 36 blows the chaff out the rear of the combine, whereas the clean grain falls downwardly and is collected on the floor of the combine. The clean grain is transferred upwardly by a clean grain elevator to the grain tank 18.

The roof of the operator's cab 16 is provided with a first position sensor 42. The first position sensor is an antenna for the reception of GPS signals. Although this sensor is located on the roof of the operator's cab 16, it may be located at any position on the combine where it would receive a good GPS signal.

The front of the operator's cab 16 is provided with a second position sensor 44. The second position sensor 44 has a transmitter for emitting laser radiation which reaches the ground approximately 10 meters ahead of the vehicle 10. The laser radiation is reflected back from the ground or crop to the sensor 44 which is also provided with a receiver for receiving this reflected radiation. The distance to the reflection point from the sensor 44 is determined by the propagation time of the laser radiation to be received by the receiver. The second position sensor 44 is pivoted about an approximately vertical axis, in order to scan a region transverse to the direction of forward movement of the vehicle 10. The signal of the receiver makes it possible to establish the angle between the forward operating direction and the position of the boundary of standing crop. Such position sensors 44 are known and are described, for example, in U.S. Pat. Nos. 6,095,254, and 6,101,795, whose disclosures are incorporated herein by reference.

The first position sensor 42 and the second position sensor 44 are connected over a bus with a controller 46 having a memory 48. The controller 46 is arranged to supply a steering controller 50 with a steering signal. The steering controller 50 is used for controlling the steering angle of the rear steerable wheels 14.

Figure 2:
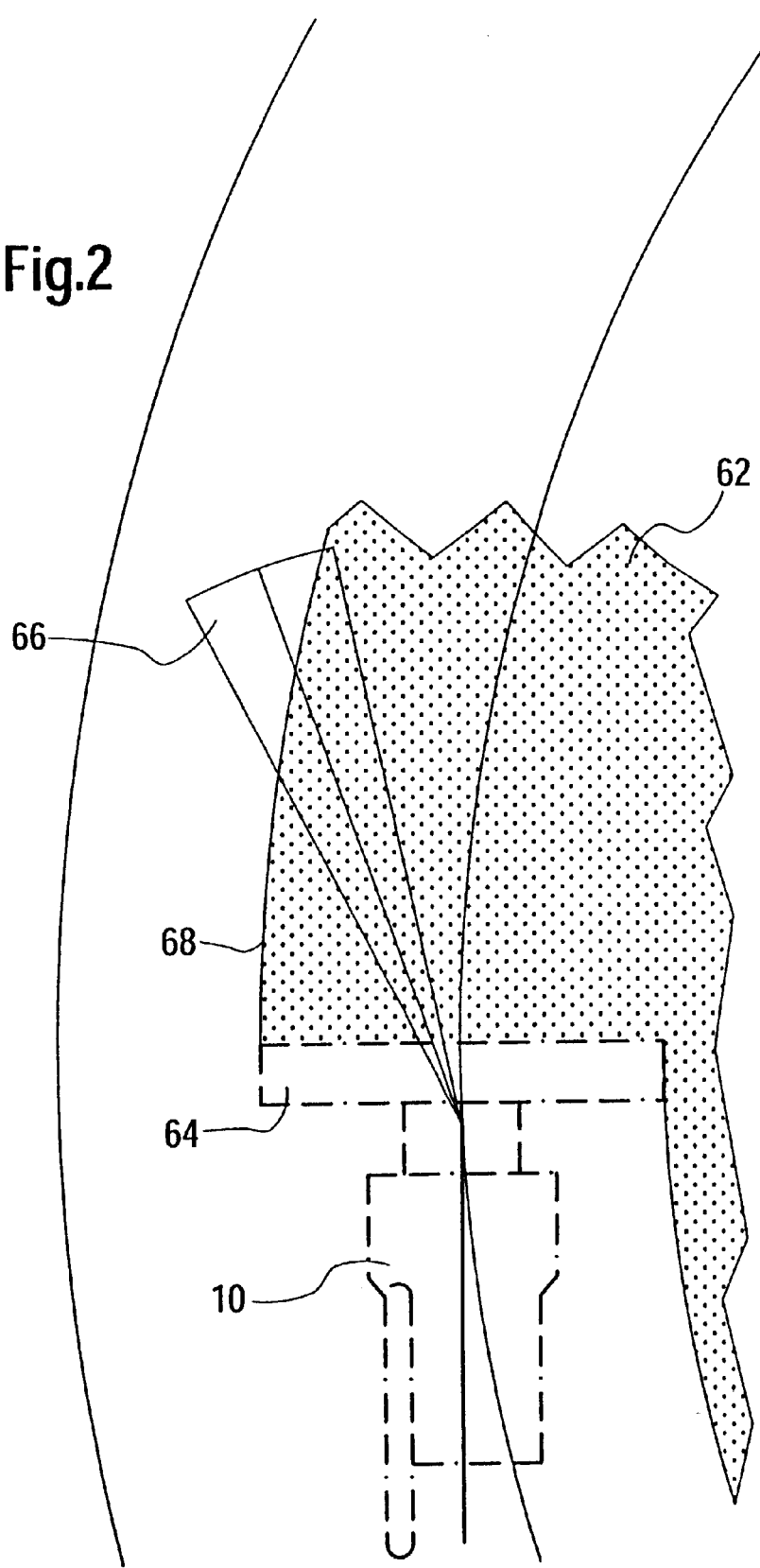
FIG. 2 is a plan view of the vehicle during a harvesting operation.

FIG. 2 shows a plan view of the vehicle 10 during a harvesting operation. The illustrated harvesting assembly 64 is a harvesting platform that cuts the plants from the ground. Numeral designator 68 identifies the crop edge between the region of the field already harvested and the standing plants 62 that are still to be harvested. The angular region covered by the sampling sensor 44 is identified with the numeral designator 66. It can be seen that the right end region of the angular region 66 covers the crop edge 68. In addition, it can be seen that a time delay exists between the measurement of the position of the crop edge 68 and the point in time at which the vehicle reaches the measured location. This time delay must be considered by the controller 46 in signaling the steering controller 50.

Figure 3:
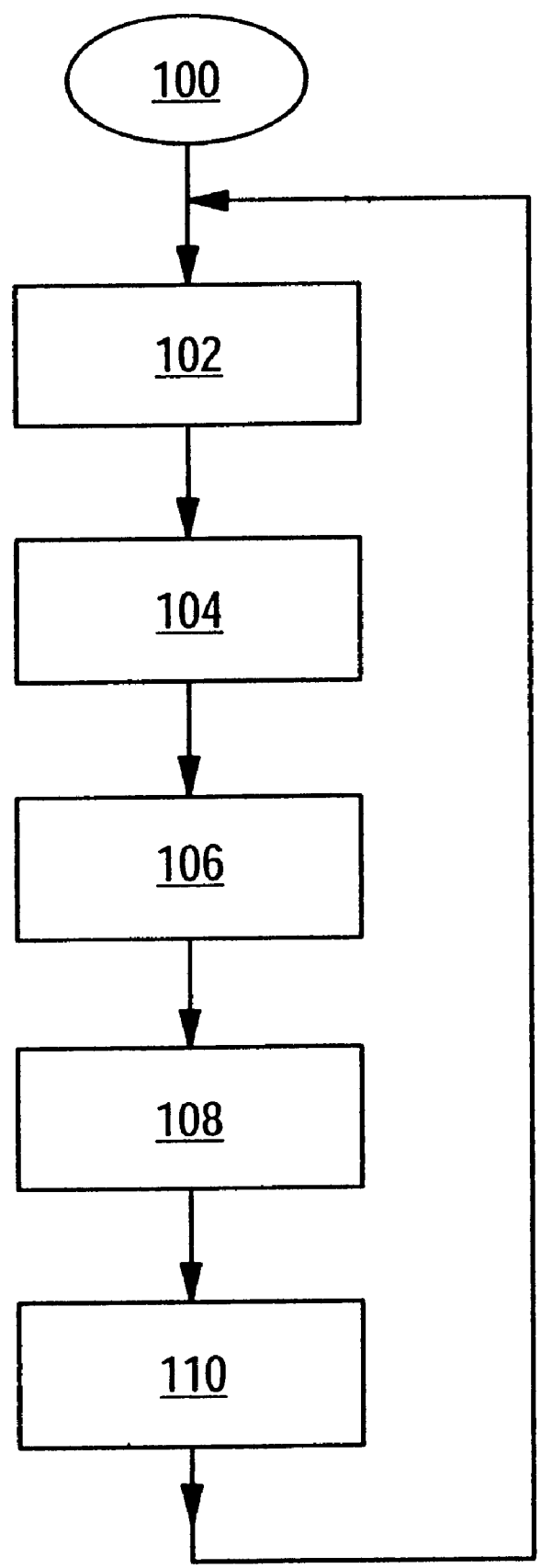
FIG. 3 is a flow chart of the evaluation arrangement.

FIG. 3 is a flow chart illustrating the operation of the controller 46. After the start in step 100, step 102 follows in which the (first) position signal of the first position sensor 42 is received. A problem exists in the fact that the signals of a satellite system may have varying accuracies depending on external conditions. In this way it may be problematical with operating surfaces with limited visible range to the sky to receive a sufficient number of GPS satellite signals or in the case of DGPS to receive correction signals. The obstacles located in the range of the utility vehicle, such as buildings or trees, generate errors in propagation time, which reduce the accuracy. Therefore the first position sensor transmits information about the quality or the accuracy of the first position signal, that is derived from the number of GPS satellite signals received at that time and their amplitude (field strength) of the signals received by the first position sensor 42. The first quality information transmitted to the controller 46 is used to measure how accurate or reliable the first position signal is.

In the following step 104, the controller 46 receives a second position signal from the second position sensor 44. The second position signal contains distance information as well as the angle between the longitudinal axis of the vehicle 10 and the crop edge at that time. Optical sensors for the recognizing crop edges of a windrow or standing crop may operate with less accuracy in dusty conditions or in fog, than in clear conditions. An output signal from the sensors that is not sufficiently precise would adversely influence the accuracy of the steering. There is also the possibility that the crop edge is beyond the visible range of the second position sensor 44, which may be the case, for example, in operating around a curve (See FIG. 2), with lodged crops or at the headlands. Sometimes two edges of the stand of crops appear as possible boundaries of the operation. If an identification of the correct edge is not possible, the second position signal of the second position sensor 44 is also useless. For this reason the controller 46 is provided with a second quality information which is derived from the size of the change in the signal received by the receiver of the second position sensor 44 at the crop edge. The greater the change in the signal at the crop edge the more exact will the measurement of the angle be under which the crop edge is located.

In step 106 the actual position of the vehicle 10 is calculated from the first position signal and the second position signal. The second position signal contains information about the position of the vehicle 10 relative to the crop edge, the precision of that information is in the range of centimeters. Since the operation on the field is normally performed in parallel paths with an operating tool at a specific offset, the position of the crop edge can be calculated from previous transitions across the field in which the position of the vehicle 10 was stored in the memory 48. On the basis of the previously calculated crop edge of the and the position of the vehicle 10 measured with the second position sensor relative to that crop edge, the second position signal can be utilized for improving the accuracy of the first position signal. The position of the vehicle 10 is determined by considering the direction of operation and the velocity of the vehicle taking into account the time delay required by the vehicle 10 to reach the position with the first position sensor 42 at which location that the second position sensor 44 detects the position. Here a consideration occurs of the two position signals in a measure that depends on the two sets of quality information. The better the quality of one of the signals relative to the other signal, the more strongly it is considered.

In the following step 108 a steering signal is generated, based on the position so determined and a map stored in the memory 48, that defines the target path that is to be followed by the vehicle 10 on the field, and transmits it to the steering controller 50. But it would also be conceivable to generate the steering signal only on the basis of the second position signal, particularly in the case of a failure of the first position signal, and to use the position information generated by the controller 46 only for the purpose of recording the path covered. In step 110 the controller 46 orders the position information calculated in step 106 to be stored in the memory 48. Step 110 is again followed by step 102.

Having described the preferred embodiment, it will become apparent that various modifications can be made without departing from the scope of the invention as defined in the accompanying claims.

I claim:

1. A system for determining the position of an agricultural vehicle comprising:

a first position sensor generating a first position signal identifying a location for the vehicle;

a second position sensor generating a second position signal identifying a location of the vehicle;

a controller is in communication with the first position sensor for receiving the first position signal and the second position sensor for receiving the second position signal, the controller calculates the location of the vehicle based on the first position signal and the second position signal, wherein one of the first and second position signals includes signal quality information, the controller considers the signal quality information in calculating the location of the vehicle by weighting the first and second position signals in response to the signal quality information, the controller is provided with memory in which target path information is stored, the target path information contains information about the path that the vehicle should cover on a field, a steering controller is in communication with the controller and is provided with steering signals derived from the target path information and the position of the vehicle.

2. A system as defined by claim 1 wherein both the first position signal include first signal quality information about the first position signal and the second position signal include second signal quality information about the second position signal, the controller evaluates the first and second signal quality information in calculating the location of the vehicle.

3. A system as defined by claim 2 wherein the first position signal is generated by a satellite signal.

4. A system as defined by claim 3 wherein the second position signal is a local position signal and the second position sensor is attached to the vehicle.

5. A system as defined by claim 4 wherein the second position sensor detects the movement of the vehicle.

6. A system as defined by claim 5 wherein the second position sensor detects its position relative to a stationary object.

7. A system as defined by claim 4 wherein the second position sensor detects its position relative to a stationary object.

8. A system as defined by claim 4 wherein the second position sensor detects a crop edge.

9. A system as defined by claim 4 wherein the second position sensor detects a boundary of operation.

10. A system as defined by claim 1 wherein the controller selects the target path information on the basis of the first and second signals quality information among several possible target path information.

11. A system as defined by claim 10 wherein the controller selects the target path information from a map stored in the memory.

12. A system as defined by claim 11 wherein the controller selects the target path information from the position of utility vehicle relative to a stationary object.

13. A system as defined by claim 12 wherein the stationary object is a crop edge.

14. A system as defined by claim 12 wherein the stationary object is a target path previously covered.

15. A system as defined by claim 10 wherein the controller selects the target path information from the position of utility vehicle relative to a stationary object.

16. A system as defined by claim 1 wherein the first position signal is generated by a satellite signal.

17. A system as defined by claim 16 wherein the second position signal is a local position signal and the second position sensor is attached to the vehicle.

18. A system as defined by claim 17 wherein the second position sensor detects the movement of the vehicle.

19. A harvesting machine for harvesting an agricultural crop, the harvesting machine comprising:

a frame;

ground engaging means for propelling the frame;

a harvesting assembly mounted to the frame;

a first position sensor for sensing the position of the harvesting machine and generating a first position signal having a first signal quality information;

a second position sensor for sensing the position of the harvesting machine and generating a second position signal having a second signal quality information;

a controller in communication with the first and second position sensor for receiving the first and second position signals, the controller using the first and second signal quality information to weight the first and second position signals and calculate the position of the harvesting machine.

20. A harvesting machine as defined by claim 19 wherein the first position sensor is a Global Positioning Sensor and the first position signal is generated from satellite signals.

21. A harvesting machine as defined by claim 20 wherein the second position sensor senses a crop edge of a crop being harvested by the harvesting machine.

* * * * *